(12) United States Patent
Doan et al.

(10) Patent No.: US 11,221,637 B1
(45) Date of Patent: Jan. 11, 2022

(54) INTELLIGENT CONTROL OF SIMPLE ACTUATORS

(71) Applicant: Poolside Tech, LLC, New Hope, PA (US)

(72) Inventors: William R. Doan, New Hope, PA (US); Stan Reznik, Riverwoods, IL (US)

(73) Assignee: Poolside Tech, LLC, New Hope, PA (US)

( * ) Notice: Subject to any disclaimer, the term of this patent is extended or adjusted under 35 U.S.C. 154(b) by 0 days.

(21) Appl. No.: 17/210,137

(22) Filed: Mar. 23, 2021

Related U.S. Application Data

(60) Provisional application No. 63/137,225, filed on Jan. 14, 2021.

(51) Int. Cl.
　　*G05D 3/12*　　　(2006.01)
　　*G05B 19/4155*　　(2006.01)
　　*F16K 31/04*　　　(2006.01)

(52) U.S. Cl.
　　CPC .......... *G05D 3/127* (2013.01); *F16K 31/046* (2013.01); *G05B 19/4155* (2013.01); *G05B 2219/45006* (2013.01)

(58) Field of Classification Search
　　USPC ....................................................... 700/282
　　See application file for complete search history.

(56) References Cited

U.S. PATENT DOCUMENTS

| | | | |
|---|---|---|---|
| 3,819,297 A | 6/1974 | East | |
| 4,090,532 A * | 5/1978 | Story, Jr. | F15B 21/02 137/624.15 |
| 4,322,297 A | 3/1982 | Bajka | |
| 5,483,227 A | 1/1996 | Kuo et al. | |
| 6,670,584 B1 | 12/2003 | Azizeh | |
| 7,931,447 B2 * | 4/2011 | Levin | F04B 49/002 417/38 |
| 8,131,497 B2 | 3/2012 | Steinberg et al. | |
| 8,313,305 B2 | 11/2012 | Bevington | |
| 8,800,473 B1 | 8/2014 | Deverse et al. | |
| 9,031,702 B2 * | 5/2015 | Pruchniewski | H04L 61/20 700/275 |
| 10,219,975 B2 | 3/2019 | Potucek et al. | |
| 2003/0163865 A1 | 9/2003 | Huang | |
| 2004/0230344 A1 | 11/2004 | Gallupe et al. | |
| 2005/0222786 A1 | 10/2005 | Tarpo et al. | |
| 2006/0272830 A1 * | 12/2006 | Fima | G01M 3/2807 169/16 |

(Continued)

FOREIGN PATENT DOCUMENTS

WO　　2021050932 A1　　3/2021

*Primary Examiner* — Md Azad
(74) *Attorney, Agent, or Firm* — Saul Ewing Arnstein & Lehr LLP; Brian R. Landry; Paul A. Leicht

(57) ABSTRACT

One aspect of the invention provides a computer-implemented method including: monitoring a current flow to a valve actuator; determining a previous position of the valve actuator; and determining a direction of movement of the valve actuator from the current flow and the determined previous position. Another aspect of the invention provides a control system including: memory; one or more processors; and a set of instructions stored in the memory that, when executed by the one or processors, cause the control system to perform a computer-implemented method as described herein.

22 Claims, 9 Drawing Sheets

(56) References Cited

U.S. PATENT DOCUMENTS

| | | | |
|---|---|---|---|
| 2007/0154319 A1 | 7/2007 | Stiles et al. | |
| 2008/0078100 A1 | 4/2008 | Kim et al. | |
| 2008/0148592 A1 | 6/2008 | Kim et al. | |
| 2008/0313921 A1 | 12/2008 | Oh et al. | |
| 2008/0313923 A1 | 12/2008 | Oh et al. | |
| 2009/0139110 A1 | 6/2009 | Oh et al. | |
| 2009/0151801 A1 | 6/2009 | Gorman et al. | |
| 2009/0204263 A1 | 8/2009 | Love | |
| 2011/0315262 A1 | 12/2011 | Butler et al. | |
| 2012/0073040 A1 | 3/2012 | Cohen | |
| 2012/0123594 A1 | 5/2012 | Finch et al. | |
| 2013/0327403 A1* | 12/2013 | Jensen | F16K 37/0083 137/1 |
| 2014/0305525 A1* | 10/2014 | Le Moing | F16K 37/0083 137/553 |
| 2015/0107675 A1* | 4/2015 | Kucera | F16K 37/0041 137/1 |
| 2015/0278930 A1 | 10/2015 | Potucek et al. | |
| 2016/0153456 A1* | 6/2016 | Stiles, Jr. | F04B 49/20 417/44.1 |
| 2017/0209338 A1 | 7/2017 | Potucek et al. | |
| 2018/0240322 A1 | 8/2018 | Potucek et al. | |
| 2019/0204203 A1 | 7/2019 | Nix | |
| 2019/0331363 A1 | 10/2019 | Peng et al. | |
| 2020/0319621 A1 | 10/2020 | Roy et al. | |
| 2021/0047853 A1 | 2/2021 | Gamboa et al. | |

\* cited by examiner

INTELLIGENT CONTROL OF SIMPLE ACTUATORS

CROSS-REFERENCE TO RELATED APPLICATION

This application claims the benefit of priority under 35 U.S.C. § 119(e) to U.S. Provisional Patent Application Ser. No. 63/137,225, filed Jan. 14, 2021. The entire content of this application is hereby incorporated by reference herein.

BACKGROUND OF THE INVENTION

Conventional pool systems rely on valve actuators to direct water through the pool systems. For example, there can be multiple fluid pathways throughout the pool system that lead the a pool, a spa, water features, and the like. Conventional valves are typically controlled by control systems having a single pole double throw (SPDT) relay providing power to a motor, which can actuate a coupled valve in one or two directions.

SUMMARY OF THE INVENTION

One aspect of the invention provides a computer-implemented method including: monitoring a current flow to a valve actuator; determining a previous position of the valve actuator; and determining a direction of movement of the valve actuator from the current flow and the determined previous position.

This aspect of the invention can have a variety of embodiments. The computer-implemented method can further include terminating power supply to the valve actuator based on the monitored current flow and the direction of movement of the valve actuator. Terminating the power supply can include switching a position of at least one of a plurality of relay switches.

The computer-implemented method can further include: determining when current flow is terminated to the valve actuator; and identifying a time period between applying power to the valve actuator and the determination when current flow is terminated to the valve actuator. The computer-implemented method can further include determining an intermediate valve actuator position based on the identified time period. The computer-implemented method can further include: applying power to the valve actuator; and terminating power to the valve actuator according to the determined intermediate valve actuator position and prior to completion of the time period.

The computer-implemented method can further include: identifying current flows for a predefined period of time; and determining a hardware malfunction based on the predefined period of time. The hardware malfunction can be selected from the group consisting of: the valve actuator being at least partially disconnected from a valve, a wiring malfunction, a malfunction in a limit switch, and a motor malfunction.

The computer-implemented method can further include: identifying that an electronic signal from a fluid flow switch fails to register; actuating a valve to a position in response to the failed registering; monitoring for another electronic signal from the fluid flow switch when the valve is in the actuated position. The computer-implemented method can further include: determining the other electronic signal form the fluid flow switch fails to register when the valve is in the actuated position; actuating the valve to another position in response to the failed registering of the other electronic signal; and monitoring for a third electronic signal from the fluid flow switch when the valve is in the other actuated position.

Another aspect of the invention provides a control system including: memory; one or more processors; and a set of instructions stored in the memory that, when executed by the one or processors, cause the control system to perform a computer-implemented method as described herein.

This aspect of the invention can have a variety of embodiments. The control system can further include at least two relay switches.

The control system can further include a plurality of electrical leads for supplying power from the control system. Monitoring the current flow can include determining that no current flow occurs while applying power to one of the plurality of electrical leads. The set of instructions, when executed, can further cause the control system to determine a wiring issue or an actuator valve issue from the no current flow. The set of instructions, when executed, can further cause the control system to determine a wiring issue or an actuator valve issue from the no current flow. The set of instructions, when executed, can further cause the control system to apply power to the motor via a second electrical lead of the plurality of electrical leads, subsequent to determining that no current flow occurs while applying power to the electrical lead. The set of instructions, when executed, can further cause the control system to: determine a cause of no current flow to be valve actuator movement is restricted by contact with a limit switch; and determine that a polarity of the valve actuator is reversed based on the no current flow. The reverse in polarity can be caused by an activation of a manual valve actuation switch.

Another aspect of the invention provides a system including: a valve; a valve actuator including a motor in mechanical communication with the valve and at least one limit switch configured to terminate motor actuation upon contacting the motor; and a control system in electrical communication with the valve actuator. The control system is configured to: monitor a current flow to the motor; determine a previous position of the valve; and determine a direction of movement of the valve based on the monitored current flow and the determined previous position.

This aspect of the invention can have a variety of embodiments. The control system can include at least two relay switches in electronic communication with the motor. Each relay switch can include a single pole single throw (SPST) relay switch. The control system can be further configured to terminate power supply to the motor by switching a position of at least one of the relay switches.

The processor can be further configured to apply power to the motor via an electrical lead. Monitoring the current flow can include determining that no current flow occurs while applying power to the electrical lead. The control system can be further configured to apply power to the motor via a second electrical lead, subsequent to determining that no current flow occurs while applying power to the electrical lead. The control system can be further configured to: determine a cause of no current flow to be that motor movement is restricted by contact with a limit switch; and determine that a polarity of the valve actuator is reversed based on the no current flow. The reverse in polarity can be caused by an activation of a manual valve actuation switch.

The control system can be further configured to: apply power to the motor; determine when current flow is terminated to the motor; and identify a time period between applying power to the motor and the determination when current flow is terminated to the motor. The current flow to the motor can be terminated as a result of the motor contacting a limit switch. The control system can be further configured to determine an intermediate valve opening based on the identified time period.

The control system can be further configured to: identify current flows for a predefined period of time; and determine a hardware malfunction based on the predefined period of time.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
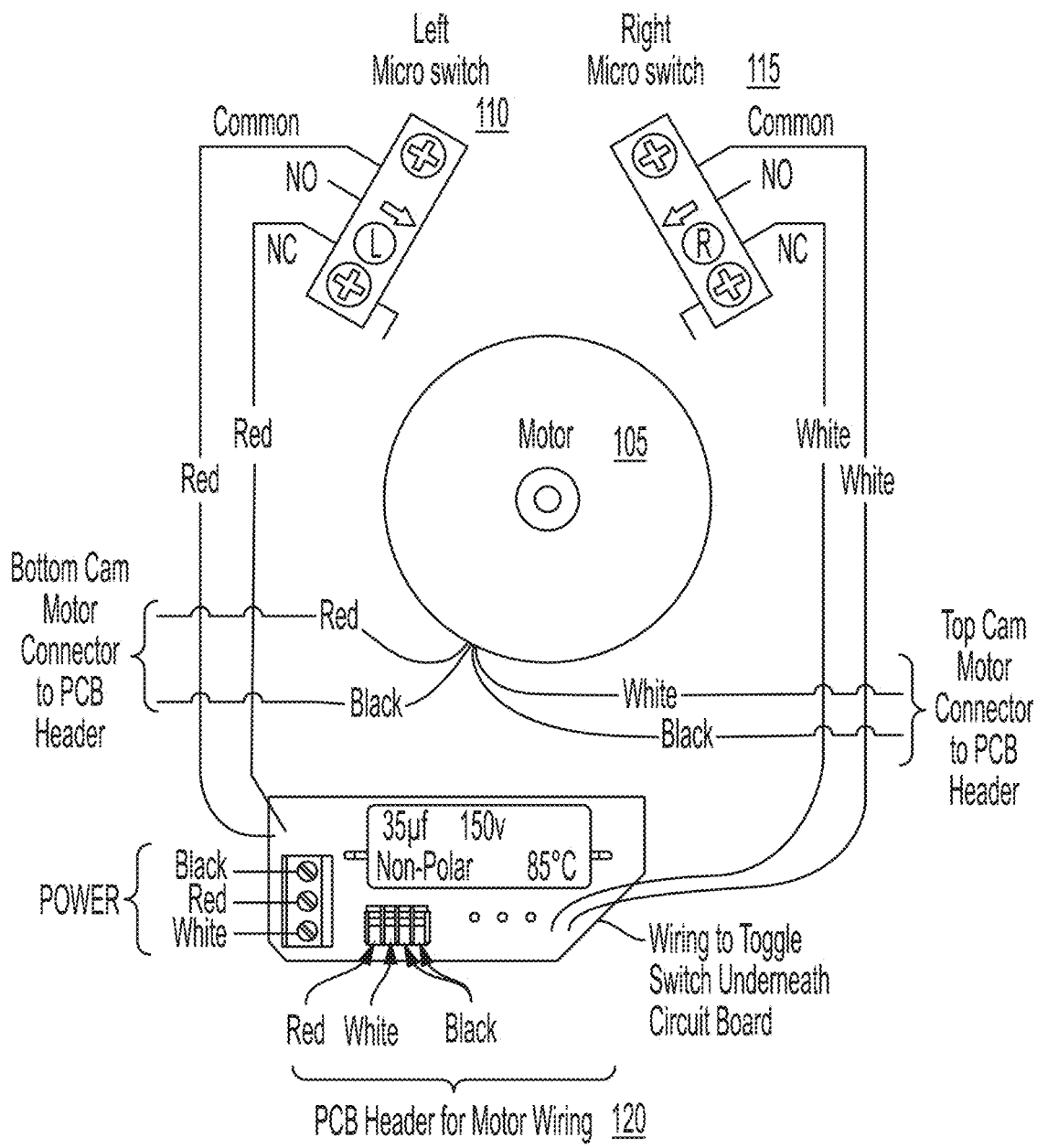
FIG. 1 depicts a conventional valve actuator.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Intelligent Control of Simple Actuators

Methods and systems for controlling actuators are described herein. Conventional pool systems rely on simple actuators for controlling fluid valves. These actuators can actuate a coupled valve in one of two directions. The actuation of these actuators are terminated once a motor shaft or valve cam of the actuator motor comes in contact with a limit switch. Thus, the actuators typically come supplied with two limit switches, which correspond to the coupled valve having its diverter be in the leftmost or rightmost position.

Further, conventional control systems for controlling the valve actuators typically rely on a single pole double throw (SPDT) relay switch for actuating the valve. Thus, the control system always supplies power to the valve actuator, and the system relies on the limit switches of the actuator to terminate the actuator's actuation.

The conventional actuation systems described above are relatively inexpensive, and are generally ubiquitous in the pool system industry. However, the capabilities of these actuator/control system combination are limited. In one respect, the conventional control system does not have the capability to determine whether the valve is actuating, as there is no monitoring activity performed by the control system.

In another respect, the conventional control system does not have the capability to determine which way the valve is turning (e.g., opening or closing, left or right, etc.). While the valve actuation directions in conventional systems are typically identified originally (e.g., when installed), these original directions can be overridden by a manual actuation control, such as a manual reverse-direction switch that is typically found on conventional pool valve actuators. If a user of the pool system activates the reverse-direction switch to manually actuate a valve, the lead energization can be reversed for that valve. Since the conventional control system does not have the capability to determine which direction the valve is moving, the conventional control system also does not have the capability to identify if a switch in lead energization occurs.

In yet another respect, conventional control systems cannot selectively position the valve outside of the limit switch placements. For example, if a user of the pool system wishes to position the valve (e.g., a two-way valve) at partially open (e.g., 70% open) and partially closed (e.g., 30% closed), the conventional control system is incapable of doing so. This incapability is due in part to the conventional control system relying on limit switches to terminate actuation of the actuator, and also in some cases due in part from the conventional controller unable to monitor whether power is actually received by the actuator.

Described herein are systems and methods for intelligent control of simple actuators. A control system can monitor current travelling to a valve actuator. From the current flow and leveraging of multiple switches, the control system can determine a direction of movement the valve actuator is moving, thereby determining the direction of movement for the coupled valve. In some cases, the control system can include multiple switches for coupling to a valve actuator. These switches can be in open or closed positions, thereby providing a power control mechanism for the control system. Further, as a switch can correspond to a direction of movement for the valve actuator, the control system can determine a direction of movement for the actuator by monitoring current flow through the switches.

Valve Actuator

FIG. 1 depicts a valve actuator according to embodiments of the claimed invention. The valve actuator depicted in FIG.

1 is a commonly used actuator for actuating valves in a swimming pool system, spa system, and the like. The valve actuator can include a motor 105, limit switches 110 and 115, and a signal transfer connector 120.

The motor 105 can be a variety of directional motors for actuating a valve. For example, the motor 105 can be a bidirectional motor, where the motor 105 rotates about an axis in a clockwise/counterclockwise direction. In some cases, the motor 105 can rotate a shaft until a cam on the shaft comes in contact with a limit switch, such as switches 110 and 115. When the cam contacts one of the switches, the contacted switch can shut power off to the motor 105, effectively terminating motor actuation. The signal transfer connector 120 can route electronic signals from the limit switches to a toggle switch for motor actuation.

Valve Actuation Control

Figure 2:
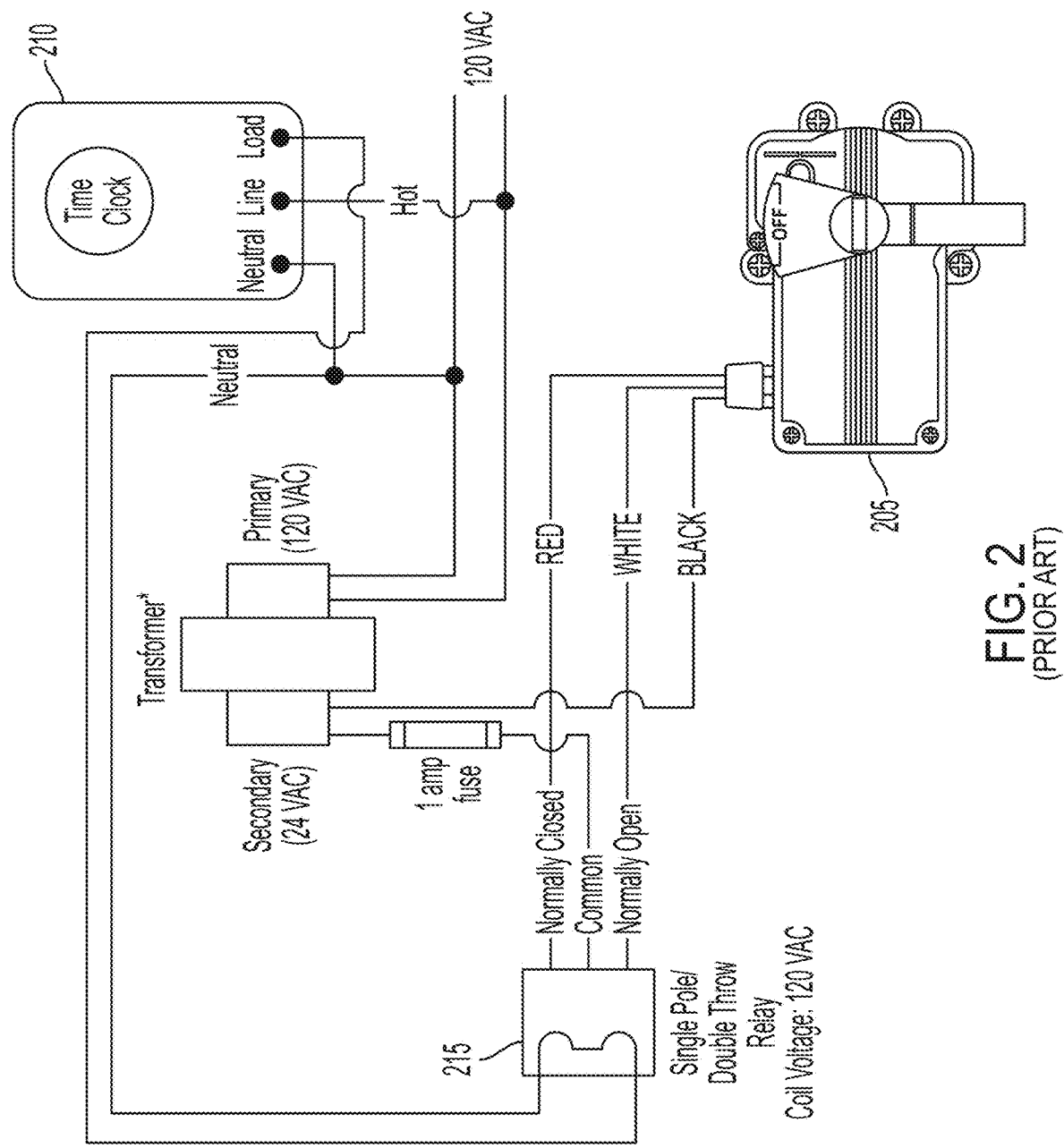
FIG. 2 depicts a conventional controller of a valve actuator.

FIG. 2 depicts a conventional valve actuation control system. The control system includes a valve actuator 205, such as that shown in FIG. 1, a controller 210, and a switch 215. The switch 215 can be a single pole/double throw (SPDT) switch, or a double pole/single throw (DPST) wired as a SPDT switch. In some cases, the switch 215 can be a relay. The controller 210 can provide a current to the valve actuator 205 via the switch 215, where the switch 215 also controls the selection of lead energization provided to the valve actuator 205. However, the valve actuator 205 is continuously energized from the controller 210, with the switch 215 controlling which direction the motor turns. Thus, the controller 210 does not receive information indicative of whether a coupled valve is actuating, as the controller 210 has no mechanism for monitoring current. Similarly, the controller 210 relies on limit switches of the valve actuator 205 (e.g., limit switches discussed in FIG. 1) to terminate motor actuation of the valve actuator and, therefore, does not monitor the direction which the valve is actuating.

Figure 3A:
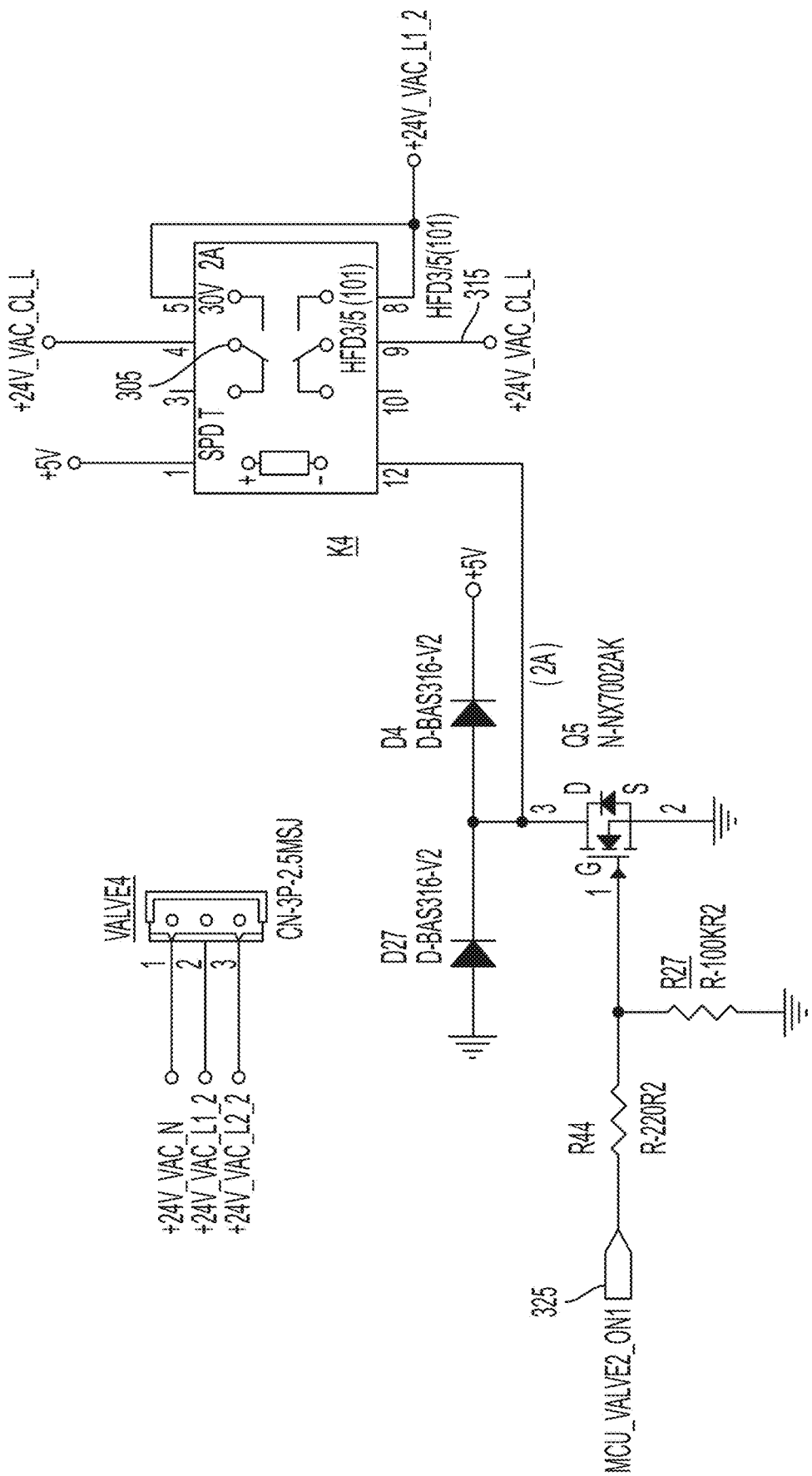
FIGS. 3A, 3B, and 4 depict circuit diagrams of a valve actuator controller according to embodiments of the claimed invention.
Figure 3B:
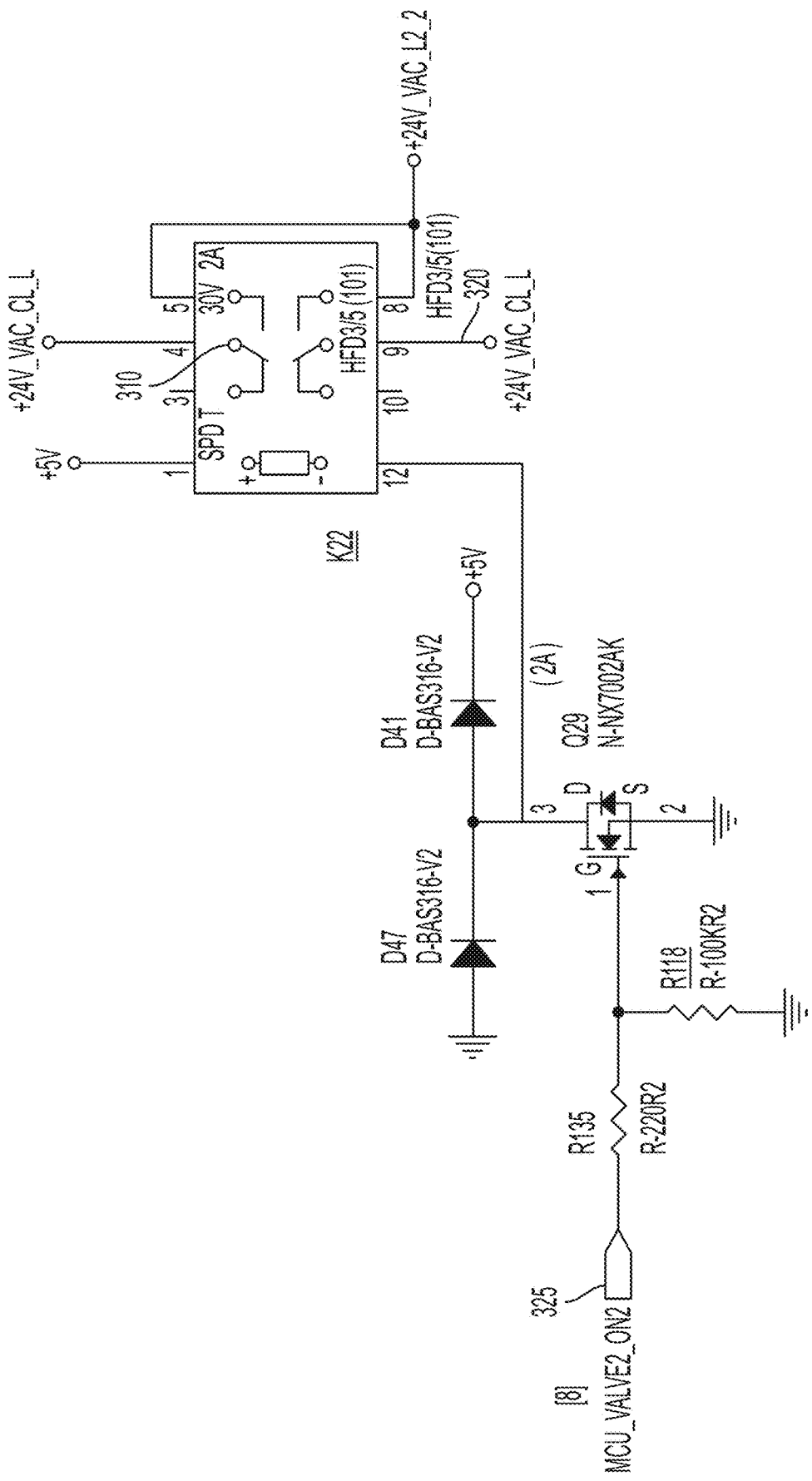

FIGS. 3A and 3B depict a valve actuation control system according to embodiments of the claimed invention. FIGS. 3A and 3B each illustrate a portion of the valve actuation control system. For example, the control system shown in FIG. 3A can illustrate the electronic components required to actuate a valve in a clockwise direction, and FIG. 3B can illustrate the electronic components required to actuate the valve in a counterclockwise direction (or vice versa). The control system can include multiple single pole/single throw (SPST) switches (e.g., switches 305 of FIG. 3A and 310 of FIG. 3B). In some cases, the control system can include single pole/double throw (SPDT) switches that are wired to act as SPSTs, however, one skilled in the art would understand that the control system can implement a variety of switches or relays that allow for independent energization of lead wires to the motor.

Each switch can be in electronic communication with a controller (e.g., via leads 315 and 320, respectively), and can be electrically coupled to a valve actuator 325, such as the valve actuator depicted in FIG. 1, via an electric lead. The controller can control the position of the switches to either be opened or closed. Thus, the controller can control which electrical lead current runs through to the valve motor by controlling the positions of the switches.

Figure 4:
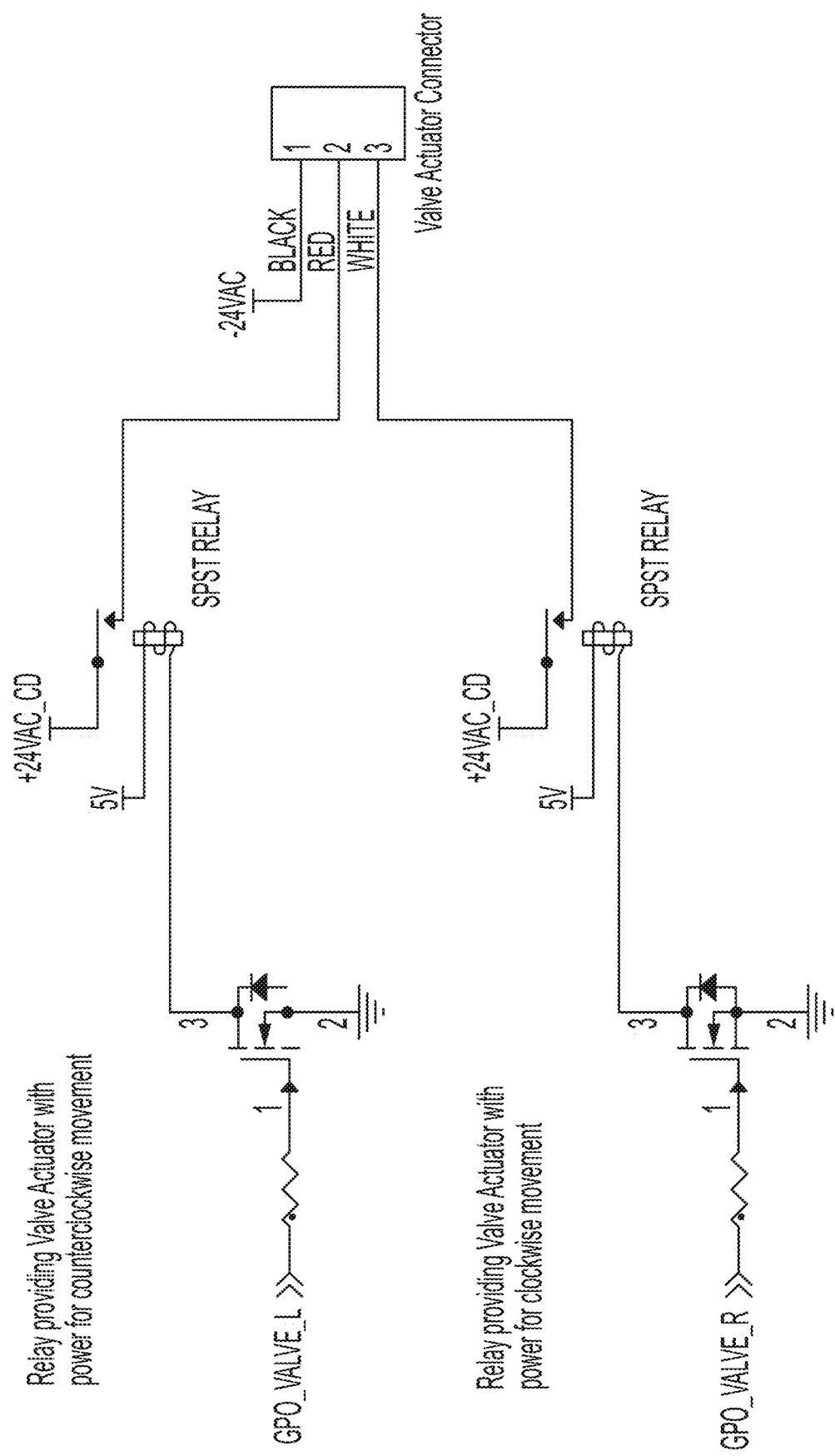

By controlling the switch positions, the controller can determine the direction of actuation for the valve. As current flow direction is dependent on the position of the multiple switches, the controller can identify valve direction based on the switch position and memory of previous switch positions. For example, in some cases an electrical lead coupled to the actuator motor can be designated as a "right-moving" or "left-moving" lead, where current flow through the lead will move the valve to the right or the left (e.g., designated by the installer). FIG. 4 depicts another embodiment of the valve actuation control system, where both portions (such as those depicted separately in FIGS. 3A and 3B) are shown together.

Figure 5:
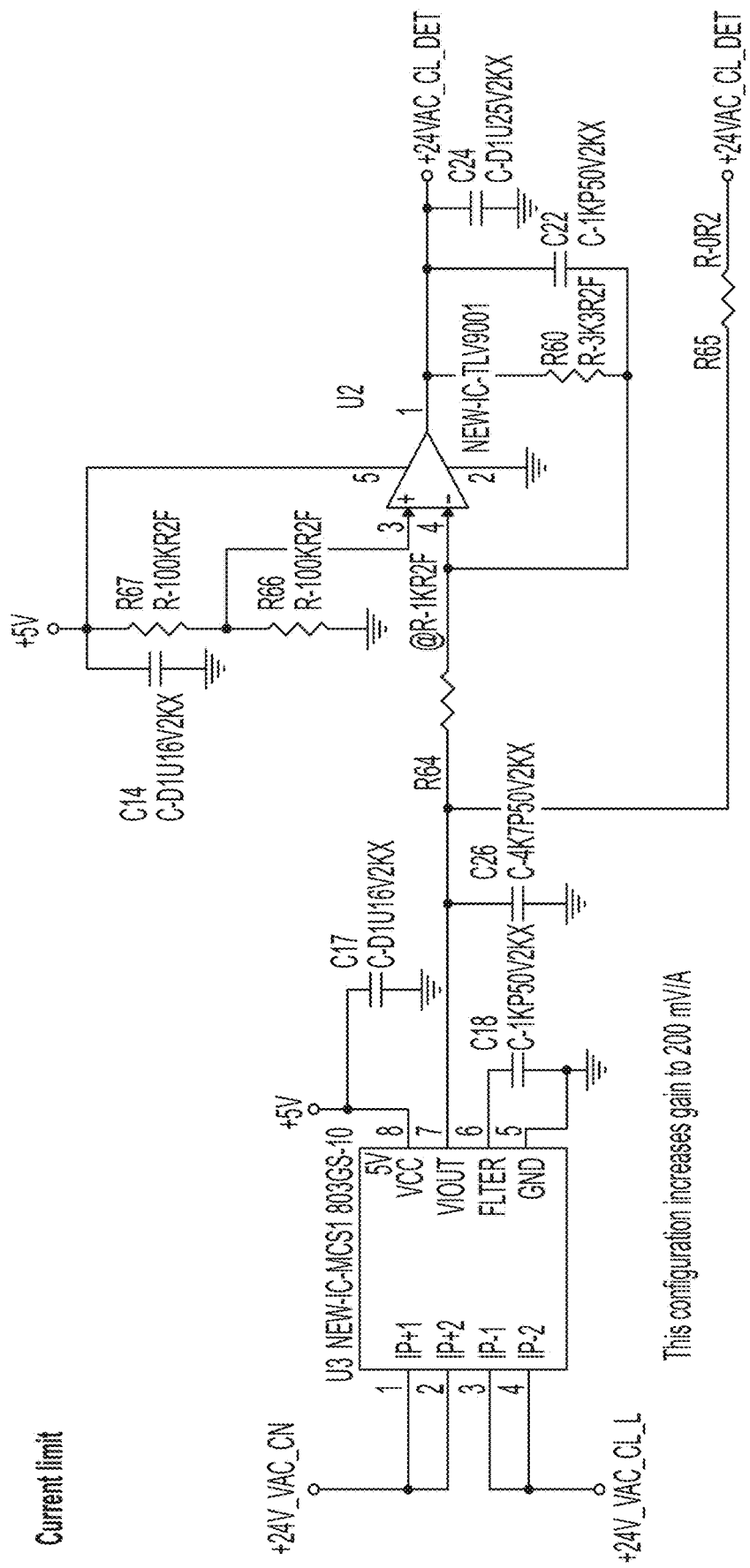
FIGS. 5 and 6 depict circuit diagrams of a current monitor of a valve actuator controller according to embodiments of the claimed invention.
Figure 6:
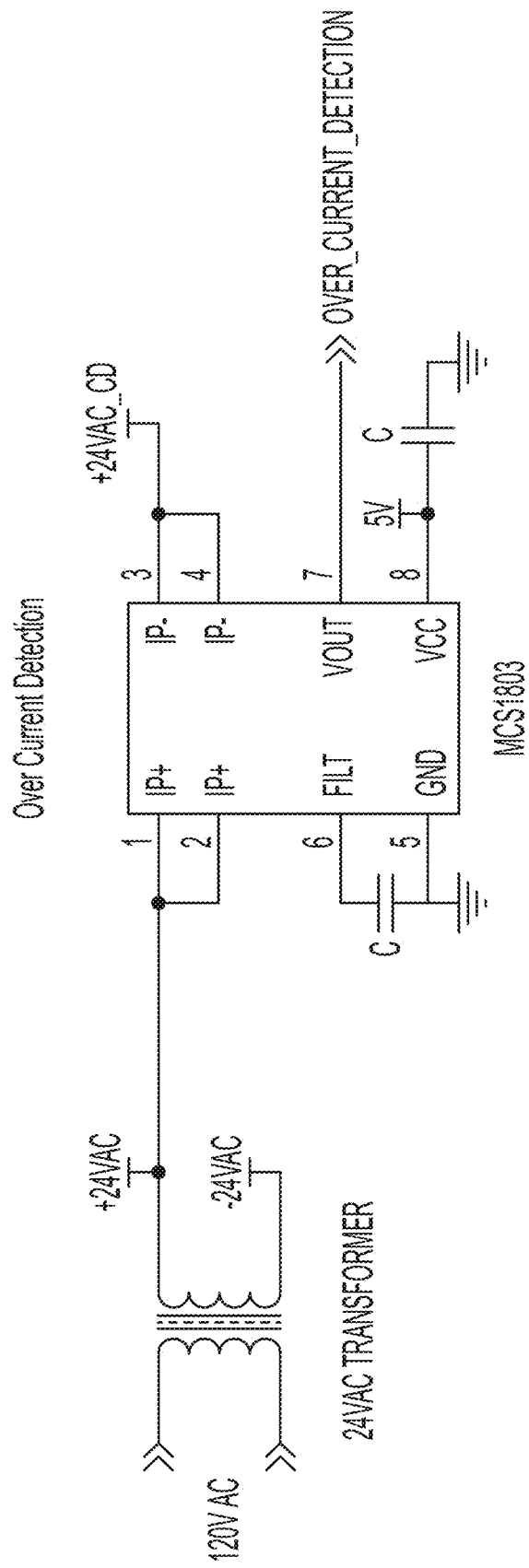

The controller can also monitor current flow to the valve actuator via in part the switches. FIGS. 5 and 6 depict circuit diagrams for a current measurement device according to embodiments of the claimed invention. The current measurement device can be a part of the controller, such as the controller depicted in FIG. 7. For example, the controller can position one of the switches to a closed (e.g., left-most or right-most) position, allowing current to flow to the actuator motor. The controller can monitor (e.g. via the current measurement device of FIGS. 5 and 6) whether current is reaching the motor, for example, through a coupled ammeter. Additionally or alternatively, the controller can indirectly monitor current from another device in fluidic communication with the valve, such as a flowmeter downstream of the valve in a pool system (e.g., such as flowmeter 805 of pool system depicted in FIG. 8). For example, the controller can initiate valve movement through positioning of at least one switch. The controller can monitor signals received from the flowmeter subsequent to the initiation to determine whether fluid flow is occurring (or lack thereof), which can be indicative of valve actuation.

Polarity Reversal Determination

In some cases, the controller can perform a remediation procedure based on current monitoring. For example, the controller can identify that current is not flowing (adequately) to the valve actuator. The controller may position the switches to flow current to another electrical lead to the valve (e.g., flowing current for clockwise directional movement of the actuator as opposed to counterclockwise). The controller can then monitor current flow through this electrical lead.

From the monitored current and the previous positions of the switches, the controller can determine whether the valve is actuating and in which direction. For example, the controller can determine that no current flowed through one electrical lead, but flowed in another electrical lead when repositioning the switches. The controller can further determine that a lead energization selection of the valve actuator has been reversed based on the current monitoring (e.g., from a manual override switch) and a stored history of identified valve positions. The controller can either generate a notification of this reversal (e.g., to be transmitted to a system user), or can redefine the lead energization selection based on switch positions, or can correct the polarity to match the defined polarity.

Malfunction Determination

In another example, the controller can determine that no current is flowing through any of the leads. Similar to the polarity determination process described above, the controller can transmit current to the valve actuator through one lead to the valve motor by positioning the SPST switches. The controller can monitor the current flow to the valve actuator for a predefined period of time. The controller can then position the SPST switches to transmit current to the valve actuator via another electrical lead. The controller can monitor current flow to the valve actuator for a predefined period of time.

If the controller identifies a lack of current being transmitted to the valve actuator via one or both of the electrical leads, the controller can determine that a hardware malfunction exists within the system. For example, the controller can determine that the valve actuator is partially disconnected from the valve, a limit switch is malfunctioning, a partial disconnection between the valve motor and an electrical lead, and the like.

Intermediate Valve Positioning

In some cases, the controller can also position a coupled valve partially opened or partially closed from monitoring current flow to the valve actuator. For example, the controller can transfer current to the valve actuator by positioning the SPST switches for current transfer. The controller can then monitor current passing to the valve actuator (e.g., via an ammeter). The controller can further monitor the time it takes from the initiation of the current transfer to a termination of the current transfer. The controller can determine that the current transfer termination is due to the valve motor contacting the limit switch, and the valve is thus fully open or closed. The controller can therefore determine a time period for fully opening or closing the valve.

From this time period, the controller can determine intermediate positions for the coupled valve. For example, the controller can determine a valve 30% opened, 50% opened, 70% opened, and the like. The controller can position the valve to an intermediate position, by positioning the SPST switches to terminate power to the valve actuator, as opposed to relying on the limit switches of the valve actuator. In some cases, the intermediate position can be confirmed through monitoring fluid flow, for example, via a flowmeter downstream of the valve in a pool system.

Pool System

Figure 8:
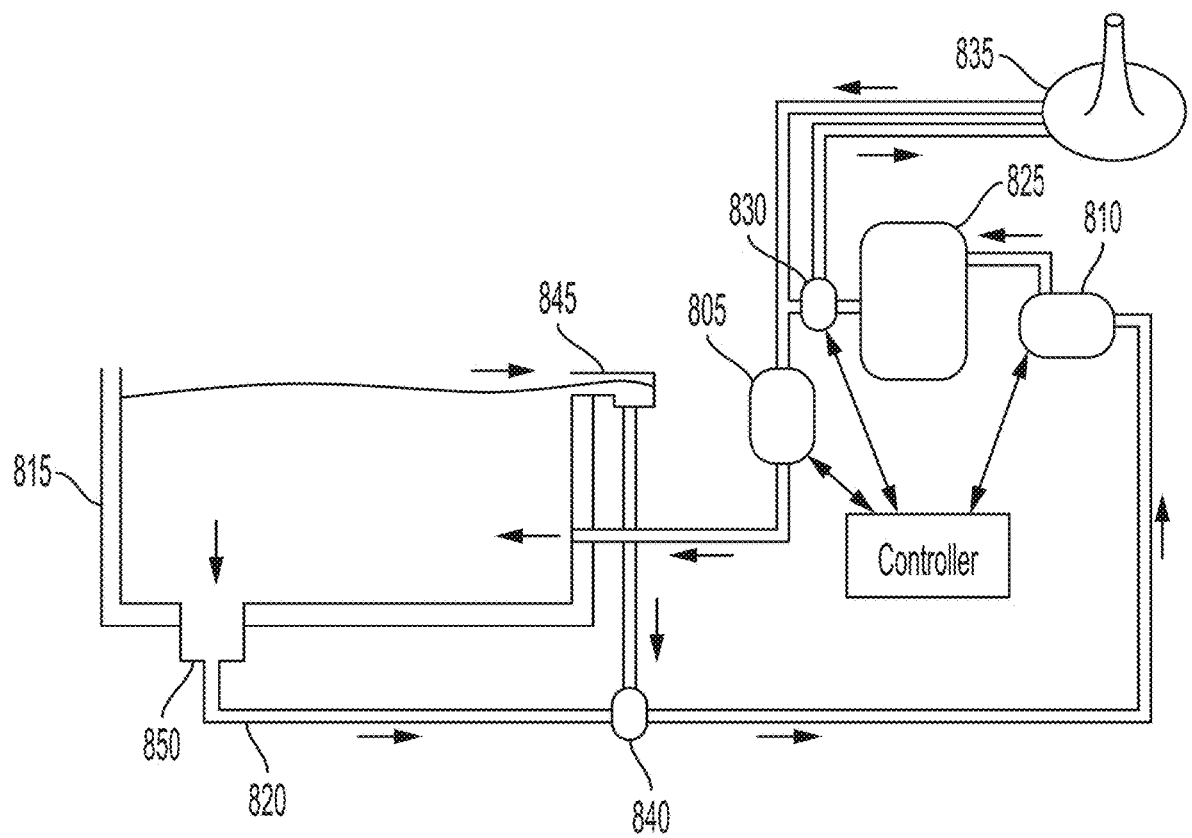
FIG. 8 depicts a pool system implementing a valve actuation controller according to an embodiment of the claimed invention.

The valve actuation system described herein can be a part of a pool system, such as the pool system depicted in FIG. 8. The pool system in FIG. 8 can include various pool components, such as a pool and/or hot tub basin 815, piping 820, flowmeter 805, valves and valve actuators 830, fluid filter 825, fluid pump 810, water feature 835, and the like. The controller can be in electronic communication with various other components of the pool system, for example the valve actuator 830.

Pool System Water Level Monitoring

In some cases, the pool control system can monitor the water level of a coupled pool system, for example the pool system depicted in FIG. 8. Over time, the water level of the pool system can drop below the skimmer line (e.g., due to evaporation). In this case, a fluid flow pump can then draw air from pool skimmers and water from bottom drains.

The valve actuator controller can position a valve to be in an either an open position or a closed position. The valve (e.g., valve 840 of FIG. 8) can be on the suction side of a fluid flow pump, and can be used to route water flow into the pump (e.g., from bottom drains 850 and skimmers 845). If a flow switch stops registering fluid flow, or substantially decreases in fluid flow registering, the valve actuation controller can reposition the valve to be fully open or fully closed (e.g., to receive water from 100% via the bottom drains or 100% via the skimmers). The valve actuation controller can then monitor fluid flow with the new valve position (e.g., via the flow switch). Once monitored, the valve actuation controller can then reposition the valve to be fully open or fully closed (e.g., to receive water from 100% the opposite fluid pathway than the previous selection). The valve actuation controller can then monitor fluid flow with this valve position.

Based on the monitored fluid flow, the valve actuation controller can determine a water level issue. For example, the valve actuation controller can identify the fluid flow significantly decreases when fluid is being received from the skimmer fluid pathway compared to the bottom drain fluid pathway. The valve actuation controller can determine that the water level of the pool basin is low, and can either alter a user of the water level and/or address the issue automatically (e.g., position the valve to receive fluid flow from the bottom drain fluid pathway as opposed to the skimmer fluid flow pathway).

Controller

Figure 7:
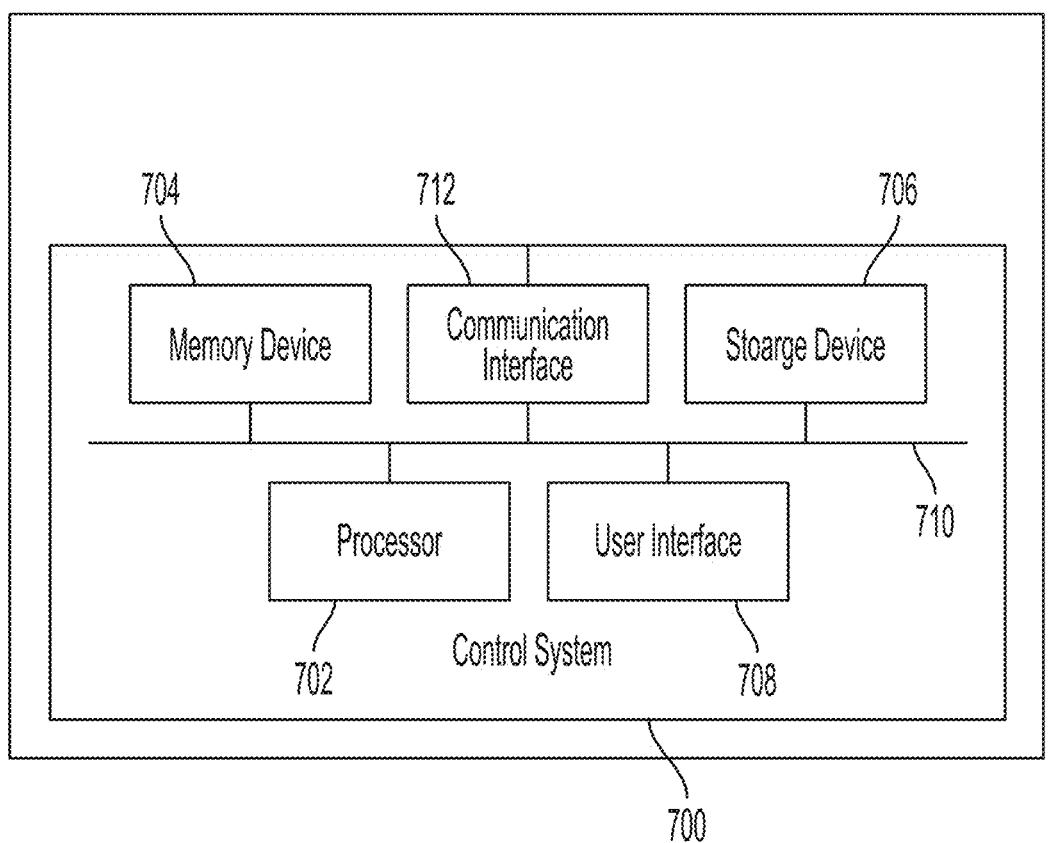
FIG. 7 depicts a valve actuation controller according to an embodiment of the claimed invention.

The valve actuation system can also include a controller. For example, a controller 700 is depicted in FIG. 7. The controller can be in electronic communication with the variable speed pump and the flow rate sensor. In some cases, the controller can transmit activation communications to the variable speed pump, such as a percentage of maximum power output or RPMs for the pump to operate under. Further, the controller can, in some cases, receive notification communications from the pump, the flow rate sensor, or both. For example, the pump can transmit communications notifying the controller of the pump activating at a given power output or rpm. The flow rate sensor can transmit flow rate communications to the controller, such as when the flow rate sensor is in a deflected or pushed position.

The controller can be an electronic device programmed to control the operation of the pool system to achieve a desired result. The controller can be programmed to autonomously carry out a system performance status regimen without the need for input (either from feedback devices or users) or can incorporate such inputs. The principles of how to use feedback (e.g., from a flow rate sensor) in order to modulate operation of a component are described, for example, in Karl Johan Astrom & Richard M. Murray, *Feedback Systems: An Introduction for Scientists & Engineers* (2008).

The controller can be a computing device such as a microcontroller (e.g., available under the ARDUINO® OR IOIO™ trademarks), general purpose computer (e.g., a personal computer or PC), workstation, mainframe computer system, and so forth. As depicted in FIG. 7, the controller ("control unit") 700 can include a processor device (e.g., a central processing unit or "CPU") 702, a memory device 704, a storage device 706, a user interface 708, a system bus 710, and a communication interface 712.

The processor 702 can be any type of processing device for carrying out instructions, processing data, and so forth.

The memory device 704 can be any type of memory device including any one or more of random access memory ("RAM"), read-only memory ("ROM"), Flash memory, Electrically Erasable Programmable Read Only Memory ("EEPROM"), and so forth.

The storage device 706 can be any data storage device for reading/writing from/to any removable and/or integrated optical, magnetic, and/or optical-magneto storage medium, and the like (e.g., a hard disk, a compact disc-read-only memory (CD-ROM), CD-ReWritable (CDRW), Digital Versatile Disc-ROM (DVD-ROM), DVD-RW, and so forth). The storage device 706 can also include a controller/interface for connecting to the system bus 710. Thus, the memory device 704 and the storage device 706 are suitable for storing data as well as instructions for programmed processes for execution on the processor 702.

The user interface 708 can include a touch screen, control panel, keyboard, keypad, display or any other type of interface, which can be connected to the system bus 710 through a corresponding input/output device interface/adapter.

The communication interface 712 can be adapted and configured to communicate with any type of external device, or with other components of the pool system. For example, double-lined arrows in FIG. 8 can illustrate electronic communication between the controller and another component of the pool system. The communication interface 712 can further be adapted and configured to communicate with any system or network, such as one or more computing devices on a local area network (LAN), wide area network (WAN), the Internet, and so forth. The communication interface 712 can be connected directly to the system bus 710 or can be connected through a suitable interface.

The controller 700 can, thus, provide for executing processes, by itself and/or in cooperation with one or more additional devices, that can include algorithms for controlling components of the pool system in accordance with the claimed invention, including valve actuators and the monitoring of current to a valve actuator. The controller 700 can be programmed or instructed to perform these processes according to any communication protocol and/or programming language on any platform. Thus, the processes can be embodied in data as well as instructions stored in the memory device 704 and/or storage device 706, or received at the user interface 708 and/or communication interface 712 for execution on the processor 702.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A computer-implemented method comprising:
monitoring a current flow to a valve actuator;
determining a previous position of the valve actuator; and
determining a direction of movement of the valve actuator from the current flow and the determined previous position;
wherein the computer-implemented method further comprises one or more of:
(a):
determining when current flow is terminated to the valve actuator; and
identifying a time period between applying power to the valve actuator and the determination when current flow is terminated to the valve actuator;
determining an intermediate valve actuator position based on the identified time period;
applying power to the valve actuator; and
terminating power to the valve actuator according to the determined intermediate valve actuator position and prior to completion of the time period; and
(b) if the actuator is a dual-limit-switch-constrained actuator:
determining that no current flow occurs while applying power to one of the plurality of electrical leads; and
determining that a polarity of the valve actuator is reversed based on the no current flow.

2. The computer-implemented method of claim 1, further comprising:
identifying current flows for a predefined period of time; and
determining a hardware malfunction based on the predefined period of time.

3. The computer-implemented method of claim 2, wherein the hardware malfunction is selected from the group consisting of: the valve actuator being at least partially disconnected from a valve, a wiring malfunction, a malfunction in a limit switch, and a motor malfunction.

4. The computer-implemented method of claim 1, further comprising:
identifying that an electronic signal from a fluid flow switch fails to register;
actuating a valve to a position in response to the failed registering; and
monitoring for a second electronic signal from the fluid flow switch when the valve is in the actuated position.

5. The computer-implemented method of claim 4, further comprising:
determining the second electronic signal form the fluid flow switch fails to register when the valve is in the actuated position;
actuating the valve to a second position in response to the failed registering of the second electronic signal; and
monitoring for a third electronic signal from the fluid flow switch when the valve is in the second actuated position.

6. A control system comprising:
memory;
one or more processors; and
a set of instructions stored in the memory that, when executed by the one or processors, cause the control system to perform the computer-implemented method of claim 1.

7. The control system of claim 6, further comprising at least two relay switches.

8. The control system of claim 6, further comprising a plurality of electrical leads for supplying power from the control system.

9. The control system of claim 8, wherein monitoring the current flow comprises determining that no current flow occurs while applying power to one of the plurality of electrical leads.

10. The control system of claim 9, wherein the set of instructions, when executed, further cause the control system to determine a wiring issue or an actuator valve issue from the no current flow.

11. The control system of claim 9, wherein the set of instructions, when executed, further cause the control system to apply power to the motor via a second electrical lead of the plurality of electrical leads, subsequent to determining that no current flow occurs while applying power to the electrical lead.

12. The control system of claim 9, wherein the set of instructions, when executed, further cause the control system to:
determine a cause of no current flow to be valve actuator movement is restricted by contact with a limit switch; and
determine that a polarity of the valve actuator is reversed based on the no current flow.

13. The control system of claim 12, wherein the reverse in polarity is caused by an activation of a manual valve actuation switch.

14. A system comprising:
a valve;
a valve actuator comprising:
a motor in mechanical communication with the valve; and at least one limit switch configured to terminate motor actuation upon contacting the motor; and a control system in electrical communication with the valve actuator and configured to:

monitor a current flow to the motor;

determine a previous position of the valve; and determine a direction of movement of the valve based on the monitored current flow and the determined previous position; and one or more of:

(a):
- determining when current flow is terminated to the motor; and
- identifying a time period between applying power to the motor and the determination when current flow is terminated to the motor;
- determining an intermediate valve actuator position based on the identified time period;
- applying power to the motor; and
- terminating power to the motor according to the determined intermediate valve actuator position and prior to completion of the time period; and (b) if the actuator is a dual-limit-switch-constrained actuator:
- determining that no current flow occurs while applying power to one of the plurality of electrical leads; and
- determining that a polarity of the valve actuator is reversed based on the no current flow.

15. The system of claim 14, wherein the control system comprises at least two relay switches in electronic communication with the motor.

16. The system of claim 15, wherein each relay switch comprises a single pole single throw (SPST) relay switch.

17. The system of claim 15, wherein the control system is further configured to terminate power supply to the motor by switching a position of at least one of the relay switches.

18. The system of claim 14, wherein the processor is further configured to apply power to the motor via an electrical lead.

19. The system of claim 18, wherein monitoring the current flow comprises determining that no current flow occurs while applying power to the electrical lead.

20. The system of claim 19, wherein the control system is further configured to apply power to the motor via a second electrical lead, subsequent to determining that no current flow occurs while applying power to the electrical lead.

21. The system of claim 14, wherein the reverse in polarity is caused by an activation of a manual valve actuation switch.

22. The system of claim 14, wherein the current flow to the motor is terminated as a result of the motor contacting a limit switch.

* * * * *